US010993781B2

(12) United States Patent
Cain et al.

(10) Patent No.: US 10,993,781 B2
(45) Date of Patent: May 4, 2021

(54) ORTHODONTIC APPLIANCE REMOVAL DEVICE (71) Applicant: 3M INNOVATIVE PROPERTIES COMPANY, Saint Paul, MN (US)

(72) Inventors: John W. Cain, Elk River, MN (US); Jennifer K. Tully, Saint Paul, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 0 days.

(21) Appl. No.: 16/753,104

(22) PCT Filed: Sep. 27, 2018

(86) PCT No.: PCT/IB2018/057506
§ 371 (c)(1),
(2) Date: Apr. 2, 2020

(87) PCT Pub. No.: WO2019/069190
PCT Pub. Date: Apr. 11, 2019

(65) Prior Publication Data
US 2020/0275994 A1 Sep. 3, 2020

Related U.S. Application Data (60) Provisional application No. 62/567,647, filed on Oct. 3, 2017.

(51) Int. Cl.
*A61C 7/02* (2006.01)
(52) U.S. Cl.
CPC .................................. *A61C 7/023* (2013.01)
(58) Field of Classification Search
CPC ........................... A61C 7/02; A61C 7/023
See application file for complete search history.

(56) References Cited

U.S. PATENT DOCUMENTS

| 2,602,998 | A * | 7/1952 | Sprague | A61C 3/14 |
| | | | | 433/141 |
| 7,201,271 | B1 | 4/2007 | Saad | |
| 8,152,525 | B2 * | 4/2012 | Rossi, III | A61C 3/00 |
| | | | | 433/167 |
| 8,167,612 | B2 * | 5/2012 | DeSanti | A61C 7/02 |
| | | | | 433/3 |

(Continued)

FOREIGN PATENT DOCUMENTS

| CN | 205198183 U | 5/2016 |
| EP | 2617384 | 7/2013 |

(Continued)

OTHER PUBLICATIONS

PCT International Search Report for PCT/IB2018/057506 dated Jan. 10, 2019.

*Primary Examiner* — Ralph A Lewis
(74) *Attorney, Agent, or Firm* — Kevin Weber (57) ABSTRACT Aspects of the present disclosure relate to an orthodontic appliance removal device that includes a shaft defining a longitudinal dimension. The shaft includes a shaft proximate end and a shaft distal end, and a lateral portion proximate to the shaft distal end extending transversely away from the shaft in a direction generally orthogonal to the longitudinal dimension. The lateral portion includes a lateral portion proximate end that is adjacent to the shaft distal end, and a lateral portion distal end configured to contact an orthodontic appliance. A handle section is also coupled to the shaft adjacent to the shaft proximate end. In another embodiment, the orthodontic appliance removal device is a multi-tool device which further comprises a seating device for seating an orthodontic appliance and/or a toothbrush.

20 Claims, 9 Drawing Sheets

(56) References Cited

U.S. PATENT DOCUMENTS

| | | | | |
|---|---|---|---|---|
| 8,182,266 B2* | 5/2012 | Creasman | ................ | A61C 3/00 |
| | | | | 433/141 |
| 10,617,488 B2* | 4/2020 | Block | ...................... | A61C 3/16 |
| 2005/0064358 A1* | 3/2005 | Nicozisis | ................. | A61C 7/02 |
| | | | | 433/3 |
| 2007/0178419 A1* | 8/2007 | Berman | ................... | A61C 7/02 |
| | | | | 433/3 |
| 2008/0160473 A1 | 7/2008 | Li | | |
| 2009/0246732 A1* | 10/2009 | Creasman | ................ | A61C 7/02 |
| | | | | 433/141 |
| 2009/0258323 A1 | 10/2009 | Saubers | | |
| 2009/0286199 A1* | 11/2009 | Creasman | ................ | A61C 3/00 |
| | | | | 433/141 |
| 2011/0045427 A1* | 2/2011 | DeSanti | ................... | A61C 7/02 |
| | | | | 433/3 |
| 2011/0045429 A1* | 2/2011 | Rossi, III | ................. | A61C 3/00 |
| | | | | 433/25 |
| 2011/0308973 A1 | 12/2011 | Patenaude | | |
| 2012/0009542 A1* | 1/2012 | Keddington | ............ | A61C 3/00 |
| | | | | 433/75 |
| 2013/0230817 A1 | 9/2013 | Kabbani | | |
| 2015/0079532 A1 | 3/2015 | Pechersky | | |

FOREIGN PATENT DOCUMENTS

| | | |
|---|---|---|
| EP | 2949290 | 12/2015 |
| KR | 101551688 | 9/2015 |
| WO | WO 2012/080784 | 6/2012 |
| WO | WO 2012-140205 | 10/2012 |
| WO | WO 2013-049355 | 4/2013 |

\* cited by examiner

ORTHODONTIC APPLIANCE REMOVAL DEVICE

CROSS REFERENCE TO RELATED APPLICATIONS

This application is a national stage filing under 35 U.S.C. 371 of PCT/IB2018/057506, filed Sep. 27, 2018, which claims the benefit of U.S. Provisional Application No. 62/567,647, filed Oct. 3, 2017, the disclosures of which are incorporated by reference in their entirety herein.

BACKGROUND

Orthodontic appliance seating devices can allow a user to seat an orthodontic appliance (e.g., a tooth positioning aligner) by biting the seating device.

Orthodontic appliance removal devices can have a hook-like mechanism that facilitates removal of the orthodontic appliance from the mouth of the user without the user having to touch the orthodontic appliance itself.

Both the orthodontic appliance seating device and the orthodontic appliance removal device can be plagued by the user losing the device or having it otherwise unavailable for use.

Various orthodontic multi-tool systems can include both the orthodontic appliance seating device and the orthodontic appliance removal device within the same multi-tool.

SUMMARY

While hook-like mechanisms of an orthodontic appliance removal device can be effective, the hook-like mechanisms can also become entangled in clothing when transported, resulting in additional user discomfort.

Aspects of the present disclosure relate to an orthodontic appliance removal device that includes a shaft defining a longitudinal dimension. The shaft includes a shaft proximate end and a shaft distal end, and a lateral portion proximate to the shaft distal end extending transversely away from the shaft in a direction generally orthogonal to the longitudinal dimension. The lateral portion includes a lateral portion proximate end that is adjacent to the shaft distal end, and a lateral portion distal end configured to contact an orthodontic appliance. A handle section is also coupled to the shaft adjacent to the shaft proximate end.

Further, by combining the seating device and the removal device in a multi-tool to address the issue of user losing the device, the seating device can be exposed when transported, thus accumulating the contents of the user's pocket. In some constructions, the seating device of the multi-tool can also act as a handle, which may further accumulate contaminants from the user's hands as well as the user's pocket. Since the seating device is designed to go into the user's mouth, this may be off-putting to some due to hygienic concerns.

Aspects of the present disclosure also relate to a system or kit that includes the removal device and a seating device for seating an orthodontic appliance. The removal device is further configured to mate with the removal device such that the removal device is protected by portions of the removal device. The system or kit can include a center housing, a toothbrush head, and a toothbrush head cover that is configured to connect together. For example, the toothbrush head cover can releasably connect to the toothbrush head, the center housing, or the removal device.

DETAILED DESCRIPTION

Aspects of the present disclosure relate to an orthodontic appliance removal device ("removal device") that has a shaft with a lateral portion that both allows a user to pull down on an orthodontic appliance and perform a prying motion against a vestibular surface of a tooth to move the orthodontic appliance in a lateral mesial direction.

Other aspects related to an orthodontic appliance seating device ("seating device") having a compressible member configured to slide over a portion of the shaft (including the lateral portion).

Other aspects also relate to a system and kit that includes a toothbrush head, a toothbrush cover, and a center housing for grasping the toothbrush head and providing a cover for the removal device and seating device.

Figure 1:
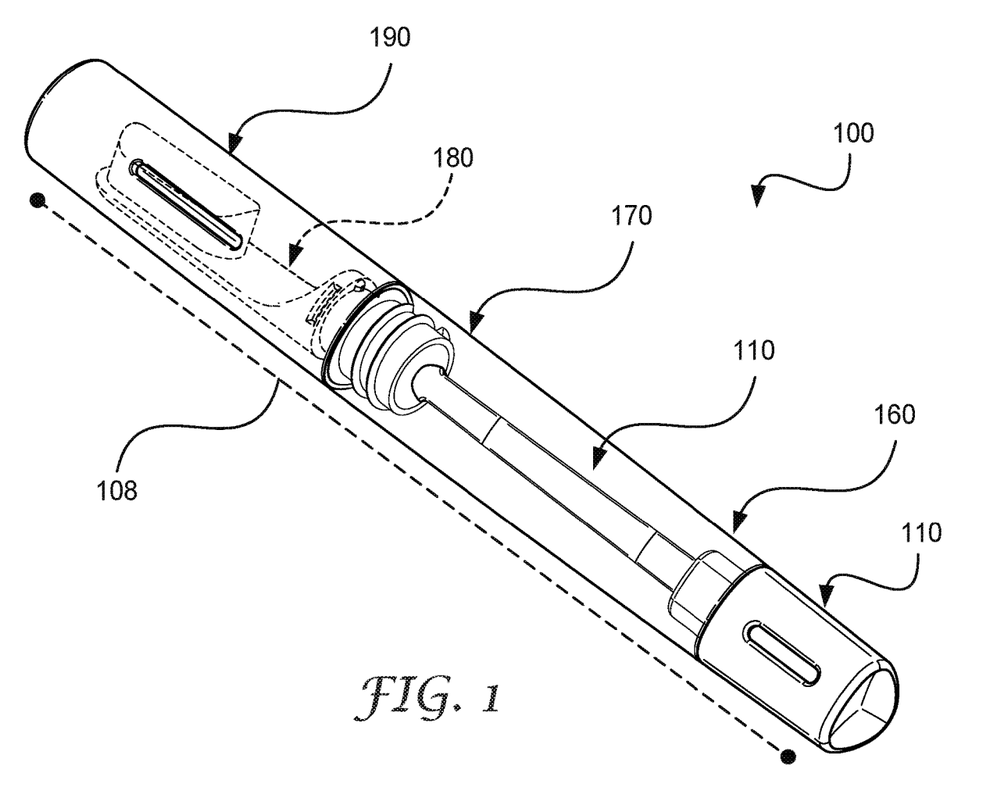
FIG. 1 illustrates an embodiment of an orthodontic multi-tool system, according to various aspects of the present disclosure.

FIG. 1 illustrates an orthodontic multi-tool system ("system") 100. The system 100 can include interconnecting components that are configured to be disassembled by a user (e.g., for cleaning or replacement of any component) and reassembled. In at least one embodiment, the individual components can be found as a kit which is assembled by the user (as discussed herein). The system 100 is generally oriented along a longitudinal dimension 108 (i.e., defined as a dimension between two furthest opposing ends of the system) when assembled. In at least one embodiment, the longitudinal dimension is contrasted with a horizontal dimension (which is a dimension between two opposing ends generally orthogonal to the longitudinal dimension). As used herein, the term "generally" can refer to a measurement that is ±5%. Thus, generally orthogonal can refer to ±4.5 degrees.

The system 100 includes an orthodontic appliance removal device ("removal device") 110, with an orthodontic appliance seating device ("seating device") 160 seated circumferentially around a portion of the removal device 110. The removal device 110 and the seating device 160 are discussed in greater detail herein.

A portion of the removal device 110 can releasably couple to a center housing 170. A portion of the center housing 170 can encompass a portion of the seating device 160 and a portion of the removal device 110.

The center housing 170 can releasably couple to a toothbrush head 180. The toothbrush head 180 allows a user to brush his/her teeth using the center housing 170 as a handle to grasp. The connection between the toothbrush head 180 and the center housing 170 is sufficient to resist lateral forces in a horizontal dimension applied on the toothbrush head 180 while maintaining the connection with the center housing 170.

The system 100 also includes a toothbrush head cover 190 that is configured to protect the toothbrush head 180 from impact as well as debris from the environment. The toothbrush head cover 190 can releasably couple to the toothbrush head 180 or the center housing 170.

Figure 2:
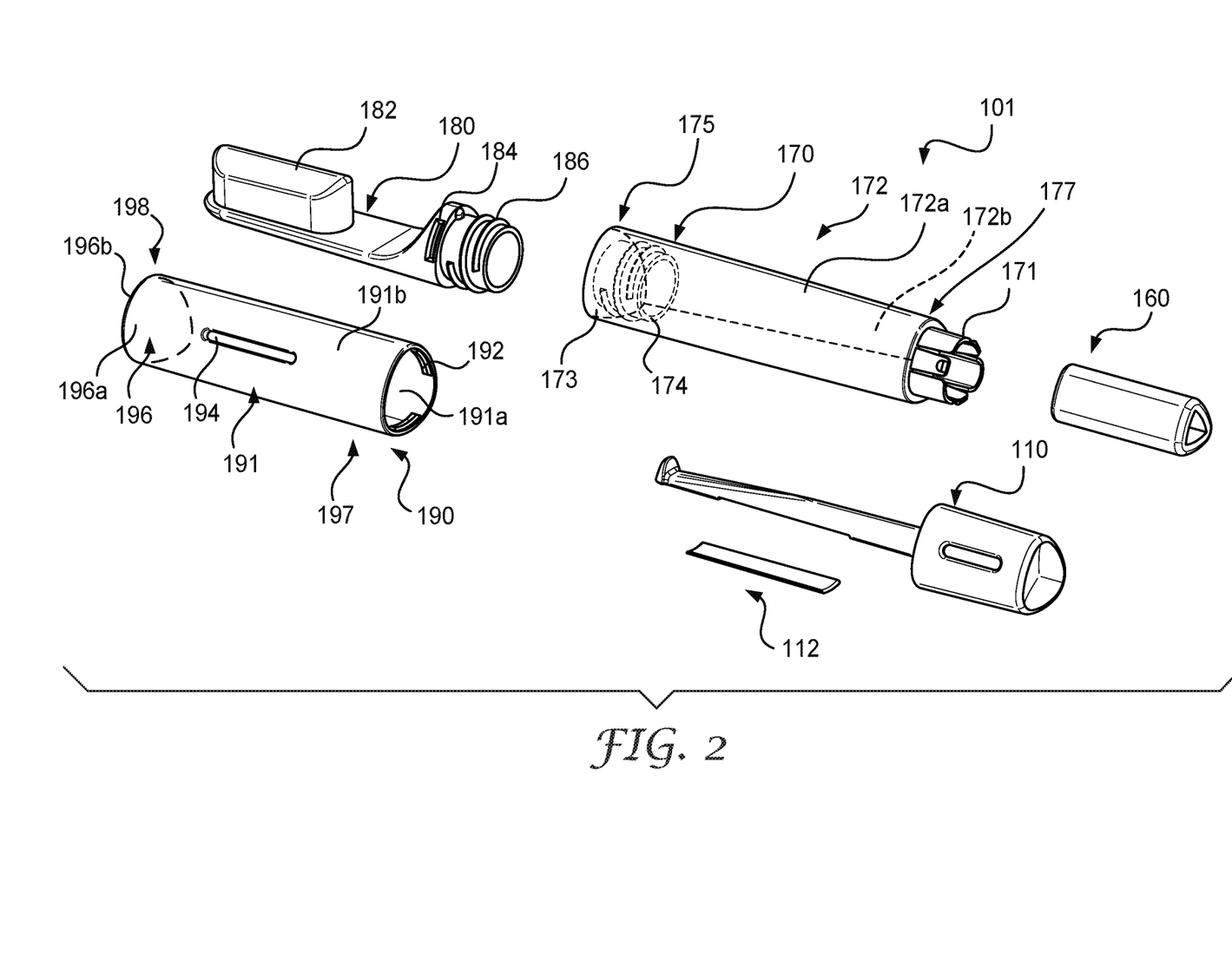
FIG. 2 illustrates the orthodontic multi-tool system of FIG. 1 as a kit, according to various aspects of the present disclosure.

FIG. 2 illustrates the system 100 of FIG. 1, disassembled as a kit 101. The kit 101 includes the same components as the system 100.

In at least one embodiment, the kit 101 includes an abrasive device 112 that is separate from the removal device 110. The abrasive device 112 can have an adhesive backing and be configured to attach to the removal device 110. The abrasive device 112 can be for removing layers of the orthodontic device to smooth out rough edges.

A portion of the removal device 110 can removably couple to the center housing 170. The removal device 110 and seating device 160 will be described further herein.

The center housing 170 can have a first end 177 and a second end 175. The center housing 170 can have at least one wall. The wall 172 can have an interior side 172b and an exterior side 172a. The exterior side 172a is configured to be grasped comfortably in a hand of the user.

The interior side 172b of the wall 172 can form a hollow portion that extends from the first end 177 to the second end. In at least one embodiment, at least one end is open and forms a tube shape. For example, at least one hole (e.g., hole 173) can be formed from the wall 172 at one end (e.g., end 175). The center housing 170 can be further configured to house portions of the removal device 110.

The center housing 170 can also include at least one securement mechanism disposed on thereon. The securement mechanism 171 is configured to secure the center housing 170 to the removal device 110. In at least one embodiment, the securement mechanism 171 is a protruding section extending laterally from the longitudinal dimension 108. The securement mechanism 171 can have a corresponding detent disposed in the removal device 110. The securement mechanism 174 is configured to secure the center housing 170 to the toothbrush head 180 or the toothbrush head cover 190. In at least one embodiment, the securement mechanism 171 or 174, in addition to a detent or an indent, can include a threaded portion disposed on the interior side 172B of the wall 172. The threaded portion can be configured to mate with a section of the toothbrush head 180.

The center housing 170 can have a cross-section that is substantially the same shape as a portion of the removal device 110 and/or the toothbrush head cover 190. For example, as shown, the center housing 170 has a triangular cross-section (e.g., for securely gripping the system 100). The wall 172 of center housing 170 can also be made of a translucent or transparent polymer (e.g., polycarbonate) which can allow the user to view whether the seating device 160 is present through the wall 172.

The toothbrush head 180 can be a device that the user uses to brush their teeth. The toothbrush head 180 can have bristles 182 with silicone fins interspersed throughout to massage the gums of the user in addition to brushing the user's teeth. The toothbrush head 180 can also include one or more securement mechanisms disposed on a portion thereof. For example, securement mechanism 184 (shown as protrusions) can be configured to mate with the toothbrush head cover 190, while the securement mechanism 186 (shown as threaded protrusions corresponding to 174) can be configured to mate with the center housing 170.

The toothbrush head cover 190 can function to cover the toothbrush head 180. For example, when the toothbrush head 180 is not being used, e.g., stored or transported, the toothbrush head cover 190 can protect the toothbrush head.

The toothbrush head cover 190 can have a first end 197 and a second end 198 oriented along a longitudinal dimension. The toothbrush head cover 190 can be formed from at least a first wall 196. The first wall 196 can have an interior side 196a and an exterior side 196b. The first wall 196 can be generally orthogonal to the longitudinal dimension of the system and be configured to form a cap over the toothbrush head 180.

The toothbrush head cover 190 can also have a second wall 191. The second wall 191 can generally be the side wall of the toothbrush head cover 190. The second wall 191 can have an interior side 191a and an exterior side 191b. The interior side 191a is configured to face the toothbrush head 180 when assembled. The exterior side 191b is configured to be grasped by fingers of the user and a removal force can be applied with the fingers. The second wall 191 can have one or more holes 194 formed therein. The one or more holes 194 can extend from the interior side 191a to the exterior side 191b such that the interior side 191a is fluidically connected to the exterior side 191b through the hole.

The toothbrush head cover 190 can also include a securement mechanism 192 disposed proximate to the second end. The securement mechanism 192 can be configured to mate with the securement mechanism 184, or a portion of the center housing 170, or a portion of the removal device 110 (such as a handle). In at least one embodiment, the toothbrush head cover 190 is configured to be interchangeable and mate with either the toothbrush head 180, the center housing 170, the seating device 160, the removal device 110, or combinations thereof.

FIGS. 3A-D illustrates a removal device 110 according to aspects of the present disclosure. The removal device 110 can be configured to be grasped by a user and a portion of the removal device 110 can be used to hook a portion of the orthodontic appliance or pry the orthodontic appliance from the teeth of the user.

The removal device 110 can include a shaft 114 and a handle section 126. The shaft 114 can be the portion that contacts the orthodontic appliance. The handle section 126 is the portion designed to be held by the user. In at least one embodiment, the handle section 126 can be optional.

Figure 3A:
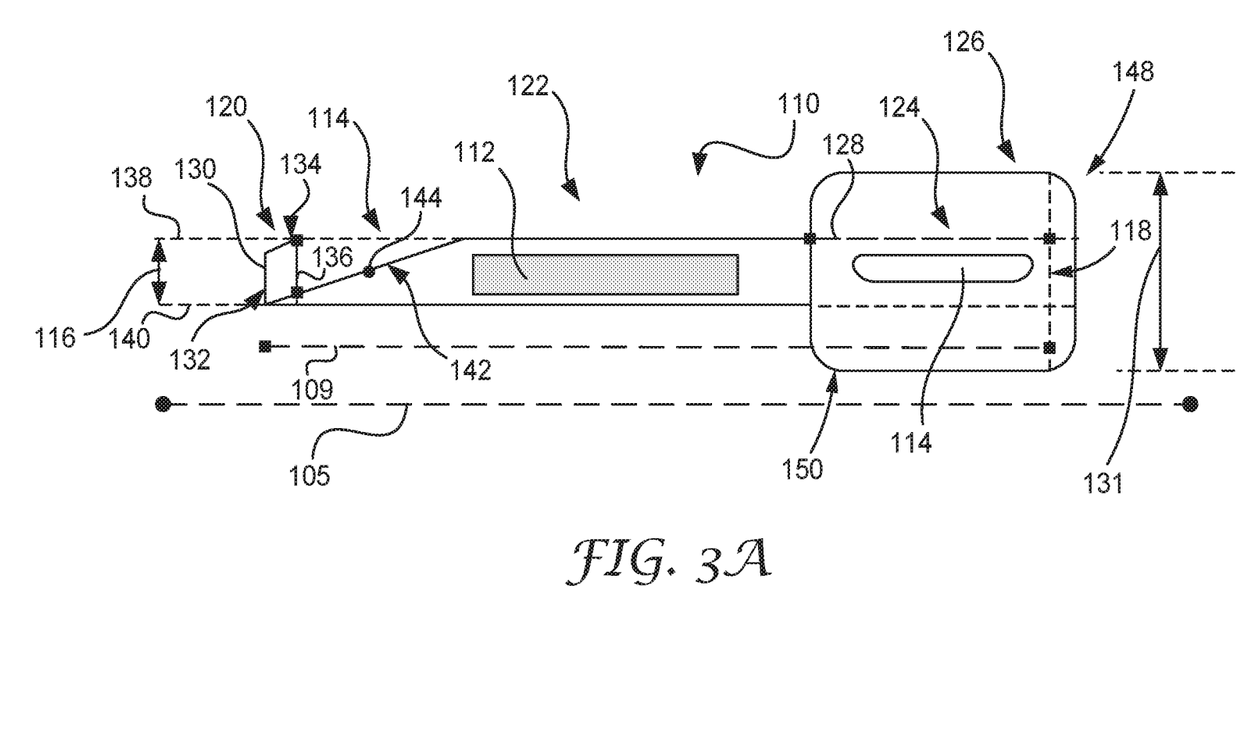
FIG. 3A illustrates a side view of a removal device, according to various aspects of the present disclosure.

The shaft 114 can have various dimensions. In at least one embodiment, the shaft 114 can be oriented along the longitudinal dimension 105 (which can be defined as the end to end distance between two opposing ends (e.g., end 148 to end 120).

The shaft 114 can have multiple dimensions, e.g., shaft dimension 116, and shaft dimension 109. In at least one embodiment, the shaft dimension 116 can be the height of the shaft 114. The shaft dimension 116 can be measured along an axis orthogonal to the longitudinal dimension 105 and along a portion of the shaft 114 (e.g., end 120 to a shaft proximate end 118). The shaft dimension 109 can be measured along an axis parallel to the longitudinal dimension 105. The shaft dimension 109 can refer to the overall length of the shaft 114 and extend from the shaft proximate end 118 to a shaft distal end 120. As shown herein, the shaft proximate end 118 does not necessarily correspond to a proximate end of the handle section 126. The handle section 126 can include an overhang which extends from end 118 to the end 148.

The shaft 114 can further have an exposed portion 122 and a covered portion 124. The covered portion 124 of the shaft 114 can be covered by the handle section 126 and is generally defined by a dimension of the handle section 126 (e.g., dimension 128). The exposed portion 122 is not covered by the handle section 126. In at least one embodiment, the exposed portion 122 is defined by a dimension from end 150 to end 120.

The exposed portion 122 of the shaft 114 also includes the distal end 120 of the shaft 114. The distal end 120 can further have a lateral portion 130 disposed or integrally formed thereon. The lateral portion 130 can be configured to hook the orthodontic appliance or allow a user to pry the orthodontic appliance from teeth. While some removal devices can have two separate tools, an aspect of the proposed disclosure enables a single removal device 110 to be used for both hooking and prying.

The lateral portion 130 can be positioned proximate to the shaft distal end 120 and extends transversely away from the shaft 114 in a direction generally orthogonal to the longitudinal dimension 108. The lateral portion 130 can have a lateral portion proximate end 132 that is proximate or even adjacent to the shaft distal end 120. The lateral portion proximate end 132 can contact a portion of the shaft 114. In at least one embodiment, the lateral portion proximate end 132 can be integrally formed with a portion of the shaft 114. In at least one embodiment, a portion of the lateral portion 130 can define the shaft distal end 120.

The lateral portion 130 can also have a lateral portion distal end 134 configured to contact an orthodontic appliance. In at least one embodiment, the lateral portion distal end 134 does not have an attachment disposed thereon (including a member that is parallel to the longitudinal dimension 105 such as a pry bar). In at least one embodiment, the lateral portion 130 does not extend past the shaft distal end 120 (e.g., no portion that is askew to an axis orthogonal to the longitudinal dimension 105). In at least one embodiment, the lateral portion 130 can have a lateral portion dimension 136 which refers to the height of the lateral portion 130 relative to a depressed portion 142. In at least one embodiment, the lateral portion dimension 136 can be defined by at least a first axis 138. The first axis 138 can be generally planar with a portion of the shaft (e.g., the top-most portion of the shaft 114). In at least one embodiment, a lateral portion dimension (e.g., one face of the lateral portion 130) can be defined by a second axis 140 which can be generally planar with a bottom face of the shaft 114. Thus, the bottom face of the shaft and the top-most portion of the shaft are opposing surfaces.

In at least one embodiment, the lateral portion dimension 136 is no greater than the first shaft dimension 116. While many shapes are possible, the lateral portion 130 can have the same general cross-sectional shape as the shaft 114. For example, if the shaft 114 has a triangular cross-section, then the lateral portion 130 also has a triangular cross-section.

The shaft 114 can also include a depressed portion 142. In at least one embodiment, depressed portion 142 refers to a portion that is depressed relative to the first axis 138. In at least one embodiment, the depressed portion 142 is proximate to the lateral portion 130 such that an orthodontic appliance can engage a portion of the lateral portion 130 in a secured manner. Too shallow of a depth can result in an unsecured engagement with the orthodontic appliance. The depressed portion 142 can be positioned proximate to the shaft distal end 120 within a portion defined by the second shaft dimension 109. In at least one embodiment, the depressed portion 142 can be defined by a slope extending from a first axis 138 toward the second axis 140. Point 135 can be the intersection of the lateral portion 130 and the depressed portion 142. Point 135 can be at least medial 144 between the first axis 138 and the second axis 140. In at least one embodiment, the depressed portion 142 can be depressed relative to a portion of the lateral portion distal end 134. The depressed portion 142 can be defined along the longitudinal dimension 105. For example, the depressed portion 142 can have a dimension no greater than the exposed portion 122 dimension.

In at least one embodiment, the shaft 114 can include an abrasive device 112. The abrasive device 112 can be disposed on a face of the shaft 114 or can be integrally formed with the shaft 114. Examples of integrally formed include modifications to allow the shaft 114 sufficient to abrade a polycarbonate surface. In at least one embodiment, the abrasive device 112 can be a microreplicated surface of the shaft 114.

Figure 3B:
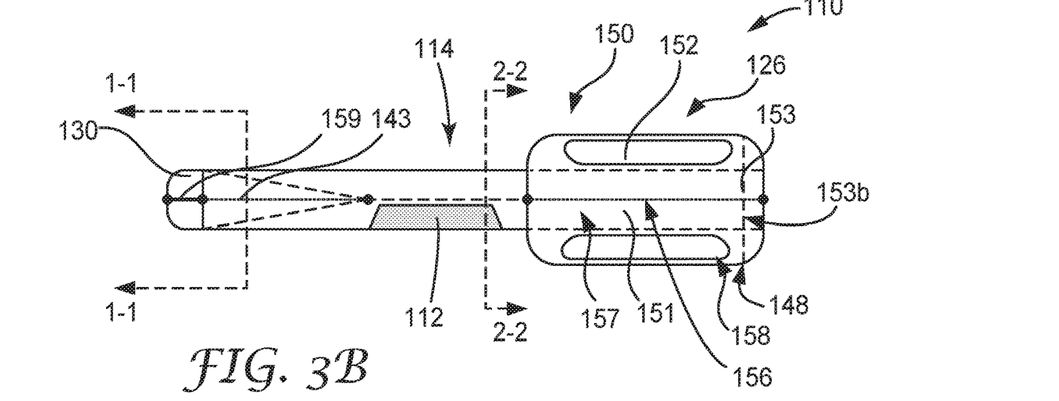
FIG. 3B illustrates a top elevational view of the removal device of FIG. 3A, according to various aspects of the present disclosure.

FIG. 3B illustrates an elevational view of the removal device 110. The handle section 126 can be described in further detail. The handle section 126 has a first end 148 and a second end 150 which is determined along the longitudinal dimension. The handle section 126 can mate with the shaft 114 proximate to the first end 148. In at least one embodiment, the first end 148 of the handle section 126 is integrally formed with the shaft proximate end. The second end 150 can float off of the covered portion of the shaft and overlaps the covered portion.

The handle section 126 can be formed from one or more walls including handle wall 153 and handle wall 151. The handle wall 153 can form an end wall of the handle section 126 and is orthogonal to the longitudinal dimension. The handle wall 153 can have an interior side (shown as 153a in FIG. 3C) and an exterior side 153b. In at least one embodiment, the interior side 153a is integrally formed with the shaft 114. The exterior side 153b can be configured to protect the shaft 114.

The handle wall 151 can define a gripping surface of the handle section 126. For example, the handle wall 151 can define the handle dimension 156 (which may be different from the dimension of the covered portion). The handle dimension 156 can be measured along an axis parallel to the longitudinal dimension. Generally, the handle dimension 156 is the length dimension of the handle section 126 and extend from end 148 to end 150. In at least one embodiment, the handle dimension 156 is less than the shaft dimension 109 (from FIG. 3A).

In at least one embodiment, the handle wall 151 has an exterior side 157 which provides a griping surface for user. The handle wall 151 can include a viewing cutout 158 formed from the handle wall 151. The viewing cutout 158 is formed by a hole in a portion of the handle wall 151. The hole extends from the interior side 152 to the exterior side 157.

FIG. 3B also illustrates portions of the lateral portion 130. For example, the lateral portion 130 can also be defined by a second lateral portion dimension 159 which describes the length of the lateral portion. The lateral portion dimension 159 can be further defined by the depressed portion. For example, the second lateral portion dimension 159 is no greater than a depressed portion dimension 143. In at least one embodiment, the depressed portion 142 is defined by the pointed end 141 (shown in FIG. 3D), lateral portion dimension 136, the point 135, the depressed portion dimension 143, the axis 138, or any combination thereof.

Figure 3C:
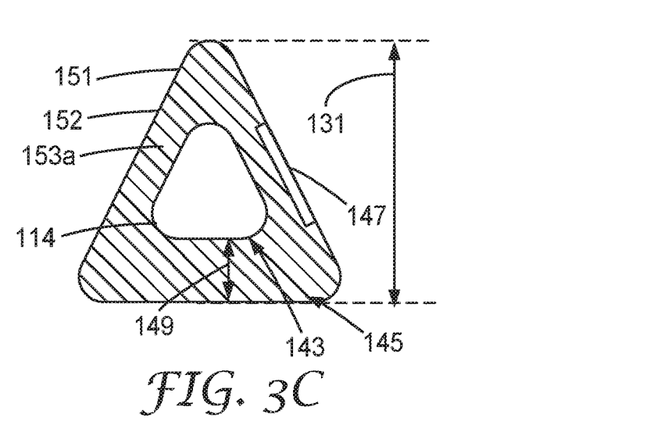
FIG. 3C illustrates a cross-sectional view of the removal device of FIGS. 3A-3B taken along lines 2-2, according to various aspects of the present disclosure.

FIG. 3C illustrates the handle section 126 in greater detail. As discussed herein, the handle section 126 can have an interior side 152 that is facing the shaft 114. The handle section 126 can be configured to have a gap 149 between the shaft 114 and the handle wall 151. The gap 149 can form a handle void that sufficient to fit a seating device.

The interior side 152 or exterior side of the handle wall 151 can have a securement mechanism 147 disposed thereon. The securement mechanism 147 can be a detent or raised portion for mating with a corresponding securement mechanism 147 from the toothbrush head cover or the center housing discussed herein. In at least one embodiment, the securement mechanism 147 can also secure the seating device.

In at least one embodiment, the handle section 126 can be defined by the handle dimension 131 which can be a measure of the height of the handle section 126. The handle dimension 131 can be measured along an axis generally orthogonal to the longitudinal dimension.

In at least one embodiment, the handle section 126 and the shaft 114 can both have a cross-sectional area. In at least one embodiment, portion of the handle section 126 has a first cross-sectional area 145 defined by the first handle dimension 131. The cross-sectional area 133 can be defined by a shaft dimension (e.g., 116 in FIG. 3A). The cross-sectional area 145 of the handle section 126 can be greater than the cross-sectional area 133 of the shaft 114. In at least one embodiment, the cross-sectional area 145 is the same shape as the cross-sectional area 133. For example, both the handle section 126 and the shaft 114 can have a triangular cross-section. In at least one embodiment, the cross-sectional area 133 of the shaft 114 and the handle section 126 can be different. For example, the cross-sectional area 145 can be a rhomboid (e.g., a parallelogram), a rhombus (e.g., a square), elliptical (e.g., circle or ellipse), or star-shaped, and the cross-sectional area 133 can be a different shape.

The handle wall 153 is shown having an interior side 153a. The interior side 153a can be mated with the shaft 114 at the first end 118.

Figure 3D:
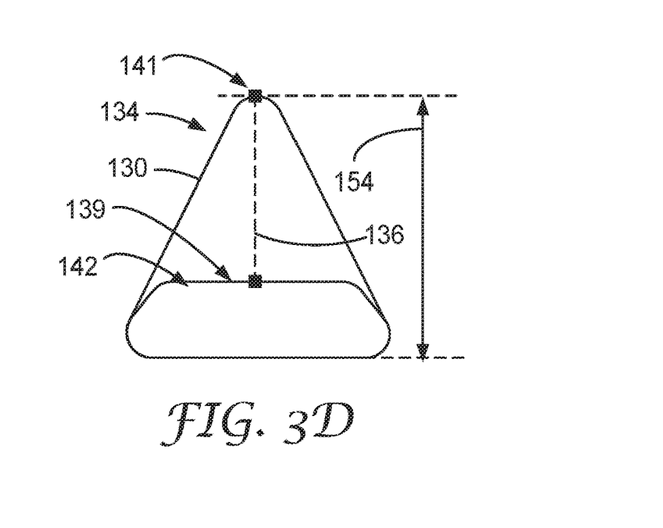
FIG. 3D illustrates a cross-sectional view of the removal device of FIGS. 3A-3C taken along lines 1-1, according to various aspects of the present disclosure.

FIG. 3D illustrates the lateral portion 130. The lateral portion 130 can have a lateral portion distal end 134 that further forms a pointed end 141. In at least one embodiment, the lateral portion dimension 136 can be defined from the depressed portion 142 to the pointed end 141. Another lateral portion dimension 154 can be defined from the pointed end 141 to a bottom face of the shaft 114. In at least one embodiment, the lateral portion dimension 136 is less than the lateral portion dimension 154.

The depressed portion 142 is shown with a trapezoidal cross-section having at least one shaft face 139 that is defined by the slope described herein. The shaft face 139 corresponding to the depressed portion 142 can be triangular (and shown in FIG. 3B). In at least one embodiment, the depressed portion 142 is defined by a trapezoidal prism that tapers from having a triangular cross-section defined by the shaft to trapezoidal cross-section defined by the lateral portion 130.

Figure 4A:
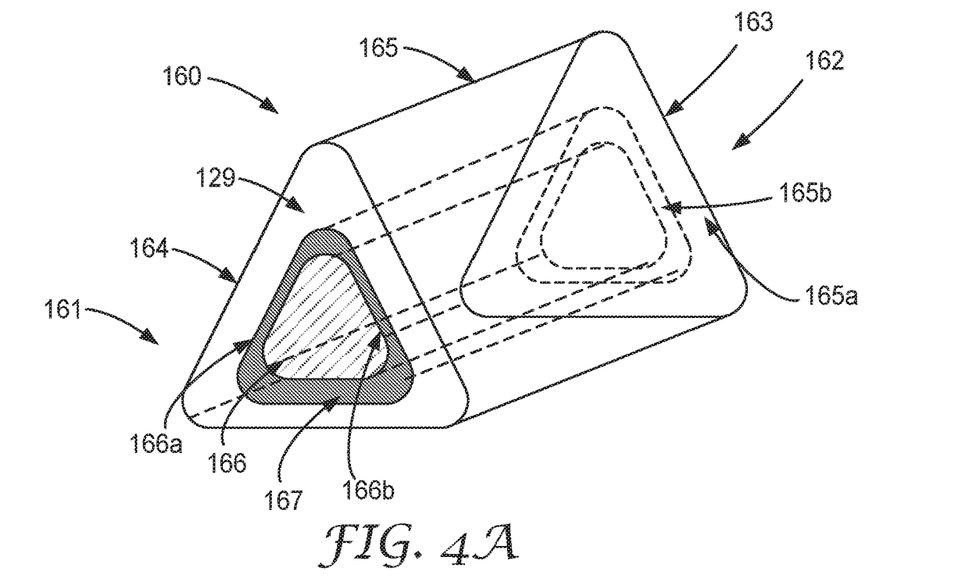
FIG. 4A illustrates a perspective view of a seating device having a compressible member, according to various aspects of the present disclosure.
Figure 4B:
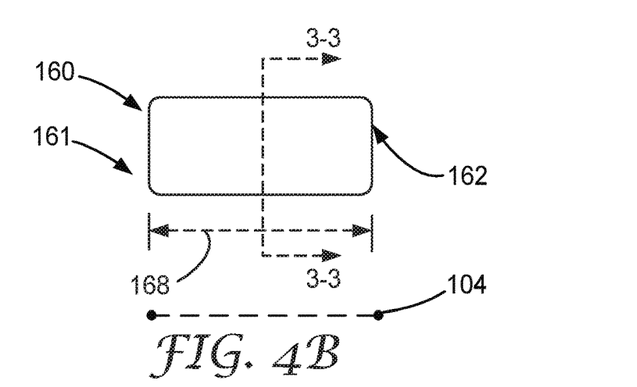
FIG. 4B illustrates a top elevational view of the seating device of FIG. 4A, according to various aspects of the present disclosure.
Figure 4C:
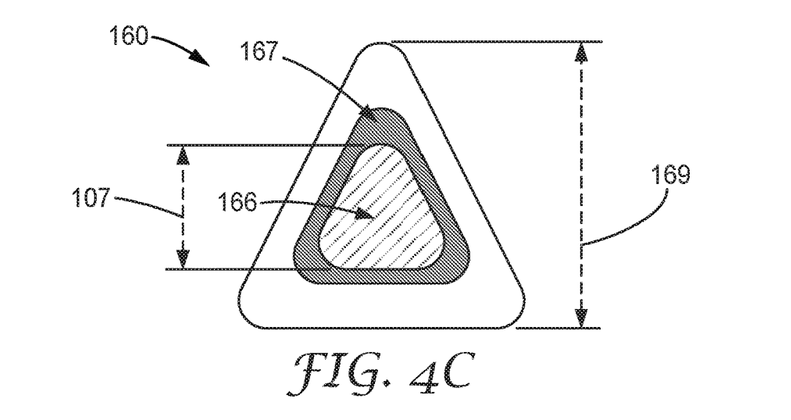
FIG. 4C illustrates a cross-sectional view of the seating device of FIGS. 4A-4B taken along lines 3-3, according to various aspects of the present disclosure.

FIGS. 4A-C illustrates the seating device 160 described herein. The seating device 160 is configured to be compressed with a biting motion from the user's jaw. The resistance provided by the seating device 160 can allow an orthodontic appliance to be seated in the user's teeth. The seating device 160 can include a compressible member 129. The compressible member 129 can be made of a material that is generally soft as not to damage the orthodontic appliance. Exemplary materials include elastomeric substances, such as closed-sell foam or rubber. The seating device 160 is further configured to be dimensioned as to mate with the removal device 110.

In FIG. 4A, the seating device 160 is shown in greater detail. The seating device 160 can have a distal end 161 and a proximate end 162 oriented along a longitudinal dimension 104. The distal end 161 can have a face 164 and the proximate end 162 can have a face 163. The seating device 160 can be tube-like formed from at least one wall 165 and has various cross-sectional shapes (shown as a triangle).

The compressible member 129 can have at least one wall 165 of material having an exterior side 165a and an interior side 165b. The wall 165 can define a portion of the hollow portion 166. For example, the interior side 165b can form a hollow portion 166 that extends from the distal end 161 to the proximate end 162. The hollow portion 166 can be keyed relative to the shaft of the removal device 110 meaning that the hollow portion 166 fits over any portion of the shaft. In at least one embodiment, the seating device 160 can have a hollow portion 166 that has at least one dimension greater than a shaft dimension.

In at least one embodiment, the seating device 160 can optionally include a tube 167. The tube 167 can be rigid relative to the compressible member 129. In at least one embodiment, the tube 167 can be seated within the hollow portion 166. The tube 167 can be formed from a wall having an interior side 166b and an exterior side 166a. In at least one embodiment, the exterior side 166a of the tube contacts the interior side 165b of the compressible member 129. In at least one embodiment, the hollow dimension (shown in FIG. 4C) of the tube 167 can be keyed relative to the shaft of the removal device 110.

In FIG. 4B, the seating device 160 is defined by a compressible dimension 168 that is parallel to the longitudinal dimension 104. The compressible dimension 168 can extend from the distal end 161 to the proximate end 162.

In FIG. 4C, the seating device 160 can have a compressible dimension 169 that is measured in a direction orthogonal to the longitudinal dimension 104. The compressible dimension 169 can refer to the height or width of the seating device 160. In at least one embodiment, the compressible dimension 169 can be less than the handle dimension discussed herein such that the seating device 160 can be seated within the handle dimension. The seating device 160 can also have a hollow portion 166 that is defined by the tube 167. The tube 167 can have a first hollow dimension 107 that is orthogonal to the longitudinal dimension.

Figure 5A:
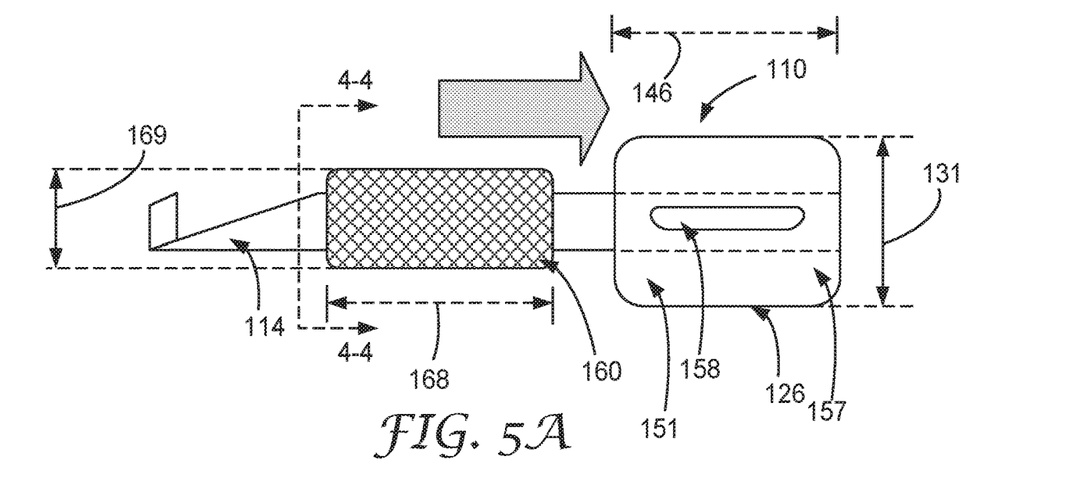
FIG. 5A illustrates a side view of the removal device and seating device in a first position, according to various aspects of the present disclosure.
Figure 5B:
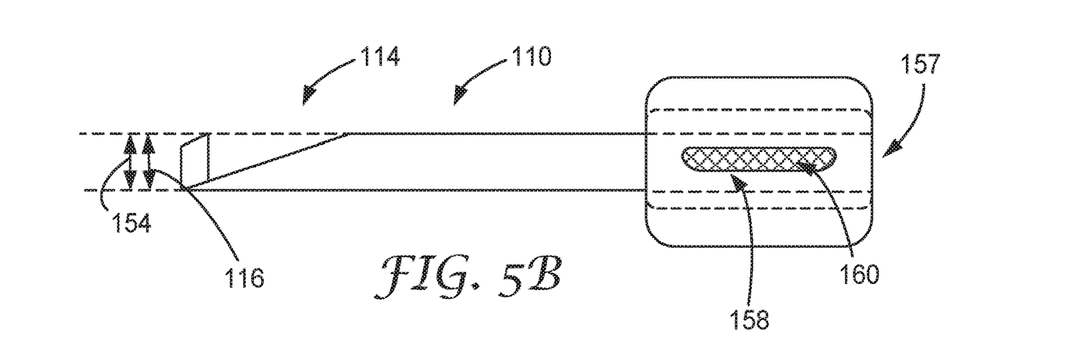
FIG. 5B illustrates a side view of the removal device and seating device in a second position, according to various aspects of the present disclosure.
Figure 5C:
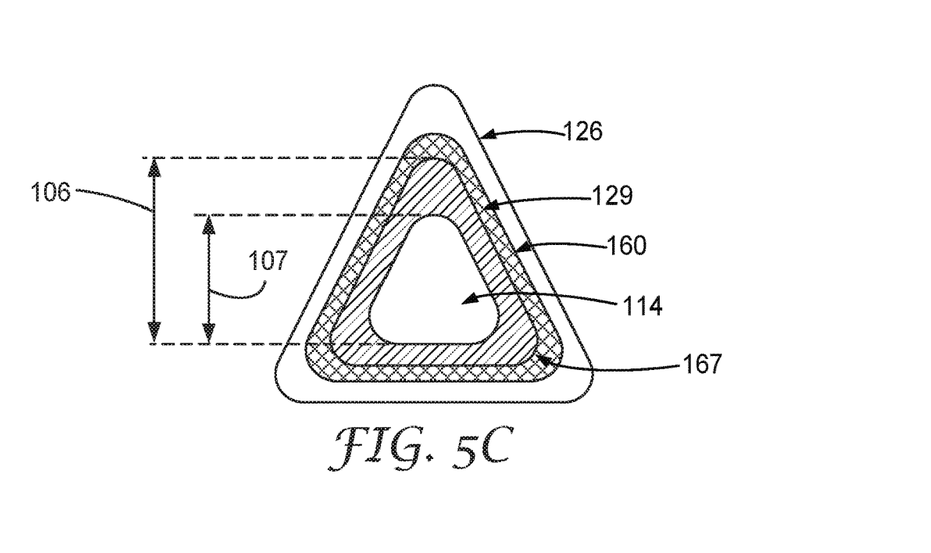
FIG. 5C illustrates a cross-sectional view of the removal device and seating device of FIG. 5A taken along lines 4-4, according to various aspects of the present disclosure.

FIGS. 5A-5C illustrates the seating device 160 being inserted into the removal device 110.

In FIG. 5A, the seating device 160 is pushed toward the handle section 126 from a first position to a second position. The first position of the seating device 160 can be from any portion overlapping the removal device 110. The second position of the seating device 160 can be when the handle section 126 overlaps any portion of seating device 160. The hollow portion of the seating device 160 is configured to move slidably along any portion of the shaft 114. In at least one embodiment, the compressible dimension 169 can be less than the handle dimension 131. The seating device 160 can also have a compressible dimension 168 that is similar to the handle dimension 146. In at least one embodiment, the compressible dimension 168 is less than the handle dimension 146. In at least one embodiment, the handle wall 151 can be configured to overlap a majority of the seating device 160 when in the second position.

As discussed herein, the handle wall 151 can have a viewing cutout 158 visible from the exterior side 157. In FIG. 5B, the seating device 160 is shown seated in the handle section 126. In at least one embodiment, the seating device 160 is viewable through the viewing cutout 158 of the handle section 126 when seated in the second position. The seating device 160 may also have a contrasting color or texture relative to the exterior side 157. For example, the seating device 160 can have an orange color contrasted against a grey exterior side.

The shaft 114 is also shown with two dimensions, a shaft dimension 116 and a lateral portion dimension 154 as discussed herein. Even though shown as the same, shaft dimension 116 and lateral portion dimension 154 can be different.

In FIG. 5C, the compressible member 129 can have a hollow dimension 106 sufficient to move slidably over the shaft 114. In at least one embodiment, the tube 167 can reduce the spacing between the compressible member 129 and any portion of the shaft 114. The tube 167 can further be coated with a material to be relatively low friction such as polyethylene. As shown, the seating device 160 can have a hollow dimension 107 that is greater than the shaft dimension 116 or the lateral portion dimension 154.

Figure 6A:
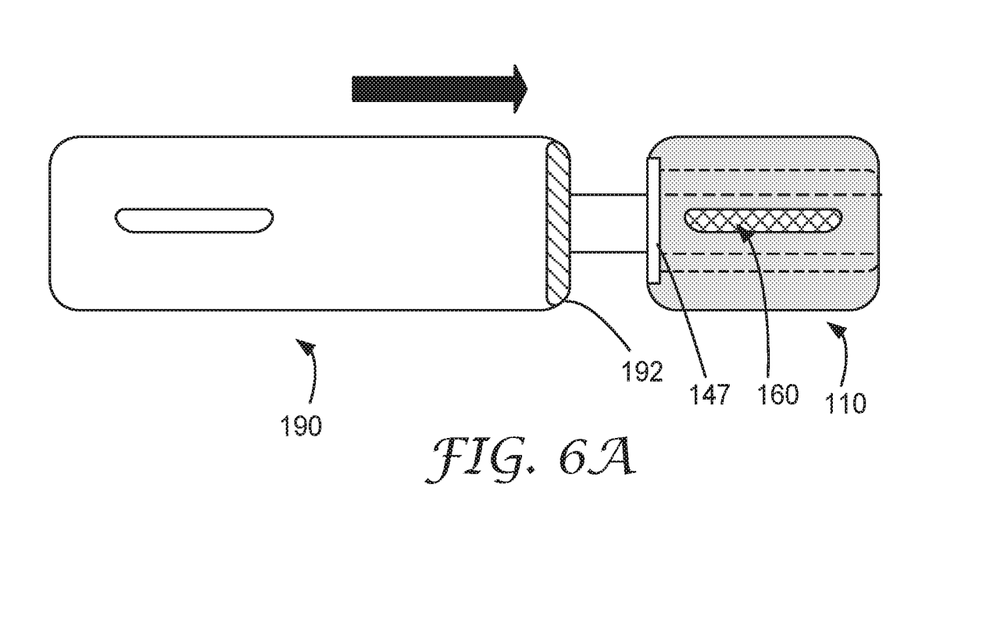
FIG. 6A illustrates a side view of the removal device, seating device, and toothbrush head cover in a first position, according to various aspects of the present disclosure.
Figure 6B:
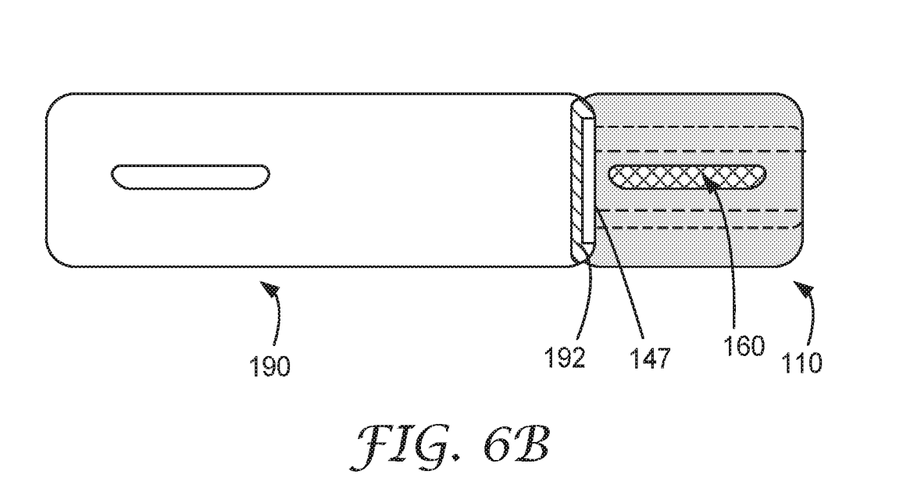
FIG. 6B illustrates a side view of the removal device, seating device, and toothbrush head cover in a second position, according to various aspects of the present disclosure.

FIGS. 6A-B illustrate the toothbrush head cover 190 mating with the removal device 110 and the seating device 160. As shown, the removal device 110 has a securement mechanism 147 disposed on the handle. The seating device 160 is seated as described in FIGS. 5A-C. Through a lateral force applied toward the handle, the securement mechanism 192 can be configured to releasably attach to a portion of the securement mechanism 147.

Figure 7A:
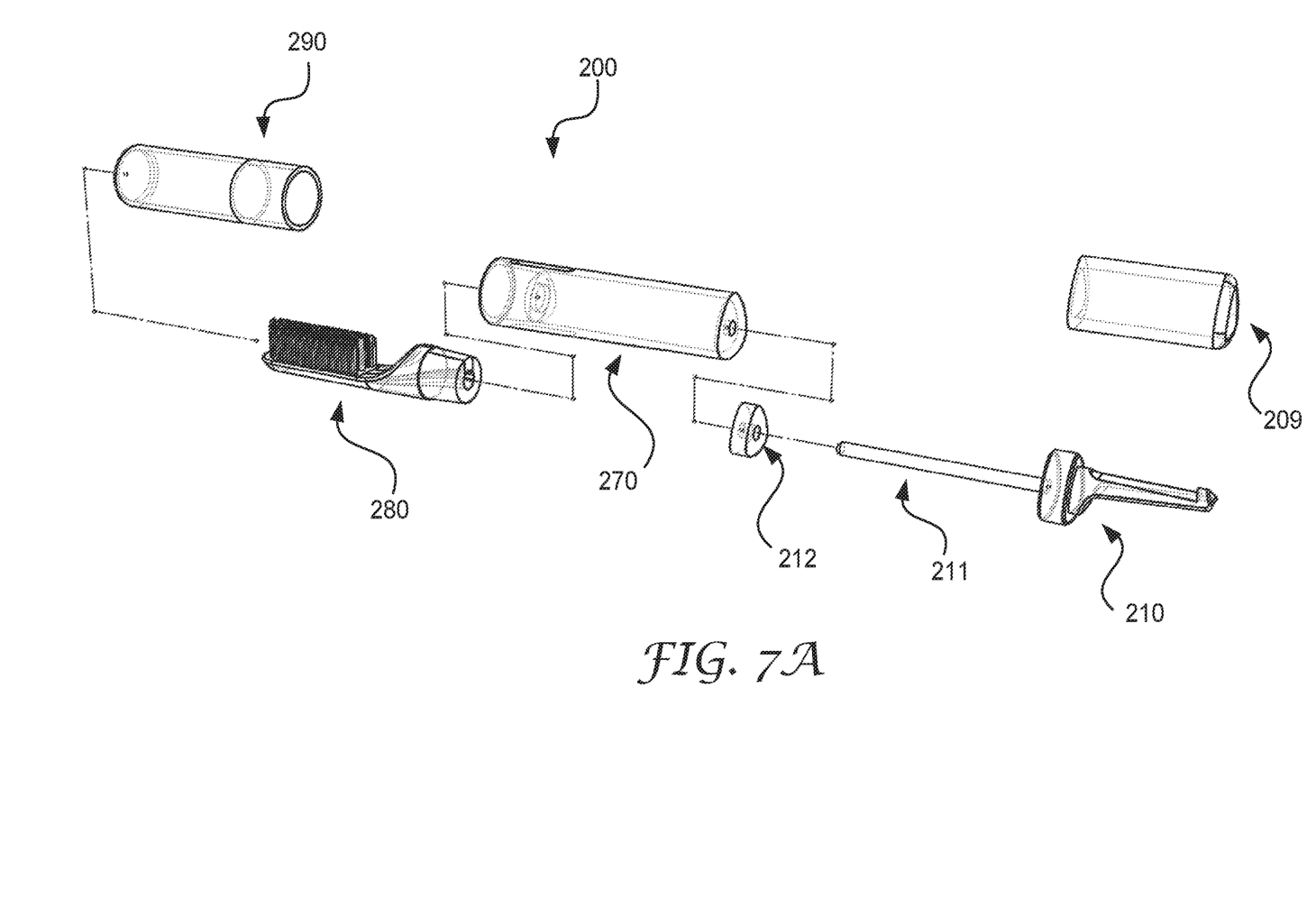
FIG. 7A illustrates an embodiment of an orthodontic multi-tool system as a kit, according to various aspects of the present disclosure.
Figure 7B:
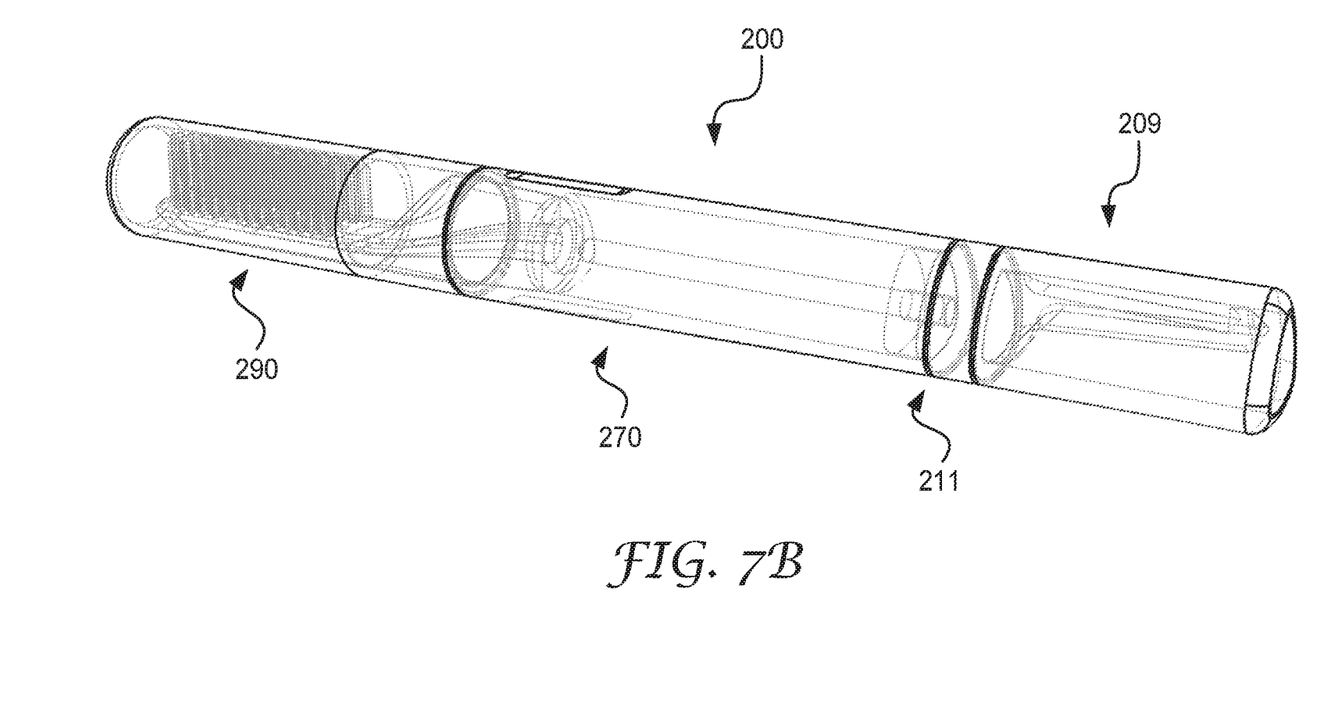
FIG. 7B illustrates the orthodontic multi-tool system of FIG. 1 assembled, according to various aspects of the present disclosure.

FIGS. 7A-7B illustrate an embodiment of a system 200. Some aspects of system 200 can be similar to system 100 described herein. For example, the toothbrush head cover 290 can be similar to toothbrush head cover 190, the toothbrush head 280 can be similar to toothbrush head 180 except that the toothbrush head 280 can be configured to have a hollow portion formed therein that is fluidically coupled to a center housing 270 so that toothpaste can be dispensed from the toothbrush head 180 and applied to the user's teeth from the center housing 270.

In at least one embodiment, the center housing 270 can be formed as a tube from an wall. The tube can be configured to hold toothpaste which can be pushed through (e.g., plunged with hydraulic pressure) using a portion of the removal device 210 and force along a longitudinal dimension. The walls can be dimensioned to store a quantity of toothpaste within a hollow portion of the tube. The walls can also be dimensioned such that a plunger 211 from a removal device 210 is configured to abut the interior side of the wall.

A seating device 212 can be placed between the removal device 210 and the center housing 270. For example, the seating device 212 can act as a spacer for preventing toothpaste from being plunged out of the device.

The removal device 210 can have a plunger 211 that is configured to fit into the hollow portion of the center housing 270 such that toothpaste does not come out of the plunger end when the plunger 211 is pushed toward the toothbrush head 280. In at least one embodiment, the plunger 211 or a portion of the center housing 270 can also include rubber gaskets to ensure a secure fit and resist toothpaste from coming out of the removal device end of the system 200.

A removal device cover 209 can cover the exposed portion of the removal device 210 and protect the removal device 210 during transport. In at least one embodiment, the removal device cover 209 can be elastomeric to act as a seating device and configured to allow the user to bite upon it.

List of Illustrative Embodiments

1. A removal device, comprising:
a shaft defining a longitudinal dimension comprising:
  a shaft proximate end and a shaft distal end;
  a lateral portion proximate to the shaft distal end extending transversely away from the shaft in a direction generally orthogonal to the longitudinal dimension, comprising:
    a lateral portion proximate end that is adjacent to the shaft distal end, and
    a lateral portion distal end configured to contact an orthodontic appliance;
a handle section coupled to the shaft adjacent to the shaft proximate end.

1a. The removal device of embodiment 1, wherein generally orthogonal means 90 degrees±4.5 degrees.

2. The removal device of embodiment 1, wherein the handle section has a first handle dimension measured along an axis generally orthogonal to the longitudinal dimension, and a second handle dimension measured along an axis parallel to the longitudinal dimension.

3. The removal device of embodiment 1 or embodiment 2, wherein the shaft has a first shaft dimension measured along an axis generally orthogonal to the longitudinal dimension and proximate to the shaft proximate end, and a second shaft dimension measured along an axis parallel to the longitudinal dimension from the shaft proximate end to the shaft distal end.

4. The removal device of embodiment 3, wherein a portion of the handle section has a first cross-sectional area defined by the first handle dimension and a portion of the shaft has a second cross-sectional area defined by the first shaft dimension.

5. The removal device of embodiment 4, wherein the first cross-sectional area is greater than the second cross-sectional area.

6. The removal device of any of embodiments 3 to 5, wherein the second shaft dimension is greater than the second handle dimension.

7. The removal device of any of embodiments 1 to 6, wherein the shaft comprises a depressed portion positioned proximate to the shaft distal end and within the second shaft dimension.

8. The removal device of embodiment 7, wherein the shaft is defined by a slope extending from a first axis planar with a surface of the shaft to a point at least medial between the first axis and a second axis planar with an opposing surface of the shaft.

9. The removal device of embodiment 8, wherein the depressed portion is depressed relative to the first axis.

10. The removal device of embodiment 9, wherein the depressed portion is depressed relative to the lateral portion distal end.

11. The removal device of any of embodiments 7 to 10, wherein the depressed portion has a dimension no greater than the second shaft dimension.

12. The removal device of any of embodiments 7 to 11, wherein the lateral portion has a first lateral portion dimension defined by the first axis and the second axis.

13. The removal device of embodiment 12, wherein the first lateral portion dimension is no greater than the first shaft dimension.

14. The removal device of embodiment 12 or 13, wherein the second lateral portion dimension is no greater than a depressed portion dimension.

15. The removal device of any of embodiments 1 to 14, wherein the lateral portion does not extend past the shaft distal end.

16. The removal device of embodiment 15, wherein a portion of the depressed portion is defined by a trapezoidal prism having at least one shaft face defined by the slope.

17. The removal device of any of embodiments 1 to 16, wherein the lateral portion distal end does not have an attachment disposed thereon.

18. The removal device of any embodiments 1 to 17, wherein the lateral portion distal end forms a pointed end.

19. The removal device of any of embodiments 1 to 18, wherein the shaft comprises a covered portion that is configured to be covered by a portion of the handle section, an exposed portion that is configured to be uncovered by the handle section.

20. The removal device of embodiment 19, wherein the covered portion is defined by the second handle dimension.

21. The removal device of embodiment 19, wherein the exposed portion is defined by the second shaft dimension minus the covered portion.

22. The removal device of any of embodiments 1 to 21, wherein the handle section has a first end and a second end, the shaft proximate end is configured to mate with the handle section at the first end.

23. The removal device of embodiment 22, wherein the second end overlaps a portion of the shaft.

24. The removal device of embodiment 22 or 23, wherein the handle section comprises a plurality of walls, comprising a first handle wall defining the first handle dimension and a second handle wall defining the second handle dimension.

25. The removal device of embodiment 24, wherein the first handle wall has an interior side mated with the shaft at the first end and the second handle wall has an interior side facing the shaft.

25a. The removal device of embodiment 25, wherein the second handle wall attaches only to the first handle wall at the first end and not the second end.

26. The removal device of embodiment 25, wherein the shaft and the interior side of the second handle wall form a gap.

27. The removal device of embodiment 26, wherein a handle void is defined by the gap.

28. The removal device of any of embodiments 24 to 27, wherein the handle section comprises a viewing cutout formed by a hole in a portion of the second handle wall extending from the interior side to the exterior side.

29. The removal device of any of embodiments 1 to 28, wherein the shaft has a triangular cross-section.

30. The removal device of any of embodiments 1 to 29, wherein the lateral portion has a triangular cross-section.

31. The removal device of any of embodiments 1 to 30, wherein the handle section has a triangular cross-section.

32. The removal device of any of embodiments 1 to 31, wherein the depressed portion has a trapezoidal cross-section.

33. The removal device of any of embodiments 1 to 32, wherein a face of the shaft has a plane that is parallel to a plane of the second handle wall.

34. The removal device of any of embodiments 1 to 33, wherein the handle section is integrally formed with the shaft.

35. The removal device of any of embodiments 1 to 34, wherein the cross-section of the shaft is a rhomboid.

36. The removal device of any of embodiments 1 to 35, wherein the cross-section of the shaft is elliptical.

37. The removal device of any of embodiments 1 to 36, wherein the cross-section of the shaft is star-shaped.

38. A system comprising:
the removal device of any of embodiments 1 to 37;
a seating device for seating an orthodontic appliance configured to mate with the removal device.

39. The system of embodiment 38, further comprising an abrasive surface disposed on the removal device.

40. The system of embodiment 39, wherein the abrasive surface is disposed on a face of the shaft.

41. The system of embodiment 40, wherein the abrasive surface is integrally formed with the shaft.

42. The system of embodiment 41, wherein integrally formed means that the shaft is microreplicated.

43. The system of any of embodiments 38 to 42, wherein the seating device comprises:
a distal end and a proximate end oriented along a longitudinal dimension;
an exterior side;
an interior side forming a hollow portion that extends from the distal end to the proximate end.

44. The system of embodiment 43, wherein the hollow portion is keyed relative to the shaft of the removal device.

45. The system of embodiment 43 or 44, wherein the hollow portion comprises a first hollow dimension orthogonal to the longitudinal dimension, wherein the first hollow dimension is greater than the first shaft dimension or the first lateral portion dimension.

46. The system of any of embodiments 43 to 45, wherein the hollow portion has a second hollow dimension parallel to the longitudinal dimension, and the second hollow dimension is less than the second shaft dimension minus the exposed portion.

47. The system of embodiment 43, wherein the exterior side of the seating device has a first compressible dimension that is orthogonal to the longitudinal dimension, wherein the first compressible dimension is less than the first handle dimension.

48. The system of embodiment 43, wherein the exterior side of the seating device has a second compressible dimension that is parallel to the longitudinal dimension, wherein the second compressible dimension is less than the second handle dimension.

49. The system of any of embodiments 38 to 48, wherein the seating device comprises a compressible member formed from closed-cell foam, or rubber.

50. The system of any of embodiments 38 to 49, wherein the hollow portion has a tube inserted therein having an interior and an exterior side, wherein the exterior side of the tube contacts the interior side of the seating device.

51. The system of embodiment 50, wherein the tube has a first interior dimension orthogonal to the longitudinal dimension that is greater than the first shaft dimension.

52. The system of any of embodiments 38 to 51, wherein the seating device is viewable through the viewing cutout of the handle when seated.

53. The system of any of embodiments 38 to 52, wherein the interior side of the second handle wall comprises a securement mechanism to mate with a portion of the seating device.

54. The system of any of embodiments 38 to 52, wherein the exterior side of the second handle wall is contrasting with the seating device.

55. A kit comprising:
the system of any of embodiments 38 to 54;
a center housing configured to store the system.

56. The kit of embodiment 55, comprising:
a toothbrush head configured to mate with the center housing.

57. The kit of embodiment 56, comprising:
a toothbrush head cover configured to mate with the center housing or the toothbrush head and cover the toothbrush head.

58. The kit of any of embodiments 55 to 57, wherein the center housing has a cross-section substantially the same shape as the handle section.

59. The kit of embodiment 58, wherein the center housing has a triangular cross-section.

60. The kit of any of embodiments 55 to 59, wherein the center housing is translucent.

61. The kit of any of embodiments 55 to 59, wherein the center housing comprises a first wall having an interior side and an exterior side, a first end, a second end, wherein the center housing comprises a tube formed from the interior side of the first wall and extending from the first end to the second end.

62. The kit of any of embodiments 55 to 61, wherein the tube is configured to hold toothpaste and be plunged by the lateral portion.

63. The kit of any of embodiments 55 to 62, wherein the toothbrush head comprises silicone fins.

64. The kit of any of embodiments 55 to 63, wherein the interior side of the first wall comprises a securement mechanism formed therein configured to mate with the toothbrush head.

65. The kit of any of embodiments 55 to 64, wherein the interior side of the first wall comprises a threaded portion formed therein configured to mate with the toothbrush head.

66. The kit of any of embodiments 55 to 65, wherein the toothbrush head cover comprises one or more holes disposed therein connecting an interior side of the toothbrush head cover with an exterior side.

67. The kit of any of embodiments 55 to 66, wherein the toothbrush head cover comprises an securement mechanism configured to mate with either an interior side of the first wall of the center housing or the interior side of the second wall of the handle section.

68. A method comprising:
grasping a seating device of the system of embodiments 38 to 54;
inserting the hollow portion of the seating device over the lateral portion of the removal device of embodiments 1 to 37.

69. The method of embodiment 68, further comprising:
pushing the hollow portion toward the first end of the handle section;
allowing the seating device to perform a mating indication.

70. The method of embodiment 69, wherein the mating indication is a tactile feedback.

What is claimed is:

1. A system comprising:
a removal device, comprising:
a shaft defining a longitudinal dimension comprising:
a shaft proximate end and a shaft distal end;
a lateral portion proximate to the shaft distal end extending transversely away from the shaft in a direction generally orthogonal to the longitudinal dimension, comprising:
a lateral portion proximate end that is adjacent to the shaft distal end, and
a lateral portion distal end configured to contact an orthodontic appliance, wherein the lateral portion does not extend past the shaft distal end;
a handle section coupled to the shaft adjacent to the shaft proximate end, wherein a portion of the handle section and a portion of the shaft form a gap; and
a seating device for seating an orthodontic appliance configured to mate with the removal device and within the gap, wherein both of the seating device and the lateral portion have a cross-section substantially the same shape as the handle section.

2. The system of claim 1, further comprising an abrasive surface disposed on the removal device.

3. The system of claim 1, wherein the seating device comprises:
a distal end and a proximate end oriented along a longitudinal dimension;
an exterior side;
an interior side forming a hollow portion that extends from the distal end to the proximate end.

4. The system of claim 3, wherein the hollow portion is keyed relative to the shaft of the removal device.

5. The system of claim 3, wherein the hollow portion has a first hollow dimension orthogonal to the longitudinal dimension, wherein the first hollow dimension is greater than the first shaft dimension or the first lateral portion dimension.

6. A system comprising:
a removal device, comprising:
a shaft defining a longitudinal dimension comprising:
a shaft proximate end and a shaft distal end;
a lateral portion proximate to the shaft distal end extending transversely away from the shaft in a direction generally orthogonal to the longitudinal dimension, comprising:
a lateral portion proximate end that is adjacent to the shaft distal end, and
a lateral portion distal end configured to contact an orthodontic appliance;

a handle section coupled to the shaft adjacent to the shaft proximate end;

a seating device for seating an orthodontic appliance configured to mate with the handle section of the removal device; and a central housing having a hollow interior and opposing first and second ends, wherein the removal device is received in the housing such that lateral portion is received within the hollow interior adjacent the first end and the handle section is located exterior to the central housing adjacent the second end.

7. The system of claim 6, wherein the seating device is received in the interior of the handle section.

8. The system of claim 6, wherein the handle section has a first handle dimension measured along an axis orthogonal to the longitudinal dimension, wherein the shaft has a first shaft dimension measured along an axis generally orthogonal to the longitudinal dimension, wherein the first shaft dimension is less than the first handle dimension.

9. The system of claim 6, wherein a portion of the handle section has a first cross-sectional area defined by the first handle dimension and a portion of the shaft has a second cross-sectional area defined by the first shaft dimension, wherein the first cross-sectional area is greater than the second cross-sectional area.

10. The system of claim 6, wherein the shaft comprises a depressed portion positioned proximate to the shaft distal end, the lateral portion does not extend past the shaft distal end and the lateral portion distal end is generally orthogonal to the lateral portion proximate end and the shaft distal end.

11. The system of claim 10, wherein the depressed portion is defined by a slope extending from a first axis planar with a one portion of the shaft to a point at least medial between the first axis and a second axis that is planar with an opposing portion of the shaft.

12. The system of claim 11, wherein a portion of the depressed portion is defined by a trapezoidal prism having at least one shaft face defined by the slope.

13. The system of claim 10, wherein the depressed portion is depressed relative to the lateral portion distal end.

14. The system of claim 10, wherein the depressed portion has a dimension no greater the first shaft dimension along an axis generally orthogonal to the longitudinal dimension.

15. The system of claim 6, wherein the lateral portion has substantially the same shape cross-sectional shape as the shaft.

16. The system of claim 6, wherein the lateral portion distal end forms a pointed end.

17. The system of claim 6, wherein both of the seating device and the lateral portion have a cross-section substantially the same shape as the handle section.

18. The system of claim 6, wherein the lateral portion does not extend past the shaft distal end.

19. The system of claim 6, wherein the seating device comprises:

a distal end and a proximate end oriented along a longitudinal dimension;

an exterior side;

an interior side forming a hollow portion that extends from the distal end to the proximate end.

20. The system of claim 6, further comprising an abrasive surface disposed on the removal device.

* * * * *